INVENTORS
OLIVER S. MEIXELL
ROBERT L. WHITTLE
NICHOLAS J. CAFARELLI, JR.
BY Ernest F. Fanwick
ATTORNEY Nov. 29, 1960 O. S. MEIXELL ET AL 2,962,714

RADIO SIGNAL SEPARATOR SYSTEM

Filed Jan. 14, 1953 3 Sheets-Sheet 2

INVENTORS
OLIVER S. MEIXELL
ROBERT L. WHITTLE
NICHOLAS J. CAFARELLI, JR.
BY Ernest Fanwick
ATTORNEY INVENTORS
OLIVER S. MEIXELL
ROBERT L. WHITTLE
NICHOLAS J. CAFARELLI, JR.
BY Ernest Fanwick
ATTORNEY 2,962,714

RADIO SIGNAL SEPARATOR SYSTEM

Oliver S. Meixell, Caldwell, Robert L. Whittle, Cedar Grove, and Nicholas J. Cafarelli, Jr., Bogota, N.J., assignors to International Telephone and Telegraph Corporation, a corporation of Maryland Filed Jan. 14, 1953, Ser. No. 331,182

3 Claims. (Cl. 343—114.5)

This invention relates to a radio signal separator system and more particularly to a radio receiving system utilizing multiple antennas and electronic correlation to separate desired signals from undesired radiations.

Many instances arise where the receiver and transmitter of a radio communication system are widely separated and the intervening space is occupied by transmitters which either intentionally or unintentionally interfere with the clear reception, by a receiving station, of the transmitted communication. In the past various attempts have been made to reduce the interference due to these interfering transmitters, but most of these attempts have required either special coding of the signals or complicated unwieldy and expensive receiving and transmitting equipment.

It is also well known in the art of radio direction finding to utilize the inequality of two signals obtained by the means of two antennas differently directed to indicate the directional bearing of a transmitter or a reflector of transmitted signals. Older direction finding systems have depended upon a rotating directional antenna to yield the azimuth of a transmitter emitting the received signals. However, most prior art direction finding systems were unable to distinguish between desired and undesired signal radiations, thus often giving a misleading or inaccurate bearing to the desired transmitter.

One of the objects of this invention, therefore, is to provide a simple radio receiving direction finding system which is sensitive only to the emissions of a predetermined transmitter at an unknown location.

Another object of this invention is to provide a radio receiving system which may be utilized to receive the signals of a radio transmitter at a predetermined location.

A further object of this invention is to provide a radio signal separator system which will be responsive to the signals of an either geometrically or electronically located transmitter and unresponsive to all other radiations.

According to a feature of this invention, a plurality of omnidirectional antennas receive signals emanating from a predetermined transmitter. The azimuth from the receiving antennas to the location of the predetermined transmitter is determined either geometrically or electronically. The signals received by each antenna are detected and correlated to yield an azimuth indication only when signals are received from the predetermined transmitter, and the system will be unresponsive to transmitters located at all other sites, thus enabling the receiving system to be utilized as a direction finder or a signal separator.

The above-mentioned and other features and objects of this invention will become more apparent by reference to the following description taken in conjunction with the accompanying drawings, in which.

Figure 1:
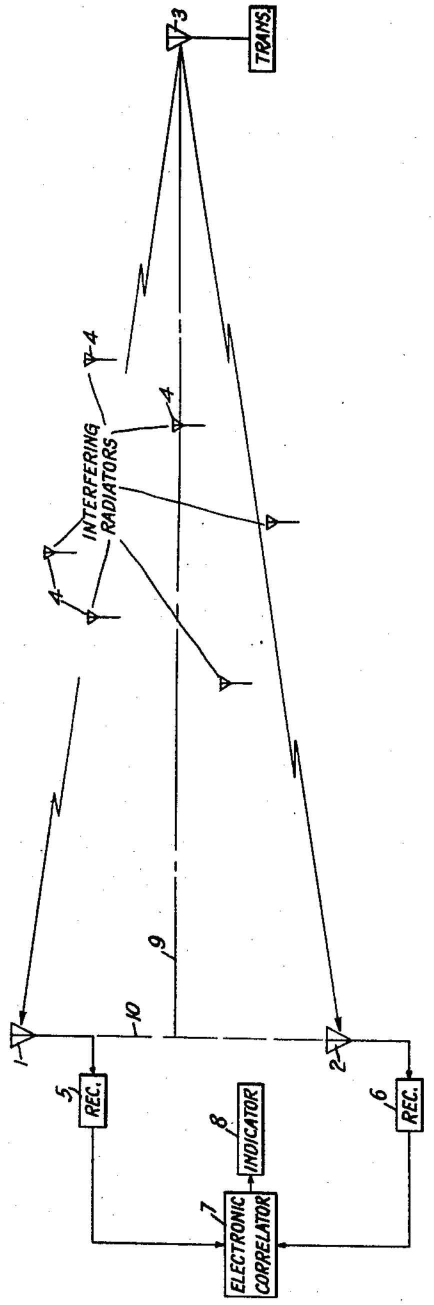
Fig. 1 is a schematic diagram in block form of a radio signal separator system responsive only to a transmitter located along the perpendicular bisector of a line joining two antennas.

Referring to Fig. 1, a radio signal separator system according to the principles of this invention is shown wherein a pair of omnidirectional antennas 1 and 2 receive all signals emanating from transmitters located within their reception areas. A transmitter 3 emitting pulsed signals is located within the reception areas of antennas 1 and 2. Generally interspersed in the reception areas of the receiving antennas 1 and 2 are a plurality of interfering transmitters 4. All signals received by antennas 1 and 2 are detected by their associated receivers 5 and 6, respectively, and the detected energy is coupled to an electronic correlator which requires coincidence in the input signals before yielding any output signal. For suitable correlators reference may be had to the M.I.T. Radiation Laboratory Series, vol. 19, "Waveforms," chapter 19, and vol. 21, "Electronic Instruments," chapter 3.11. The output of correlator 7 comprises the product of the instantaneous values of all signals that are simultaneously received by antennas 1 and 2. If antennas 1 and 2 do not simultaneously receive a signal, then the instantaneous product output of the electronic correlator 7 must be zero since the output of one of the detectors 5 or 6 will be zero. The output of correlator 7 which indicates the simultaneous reception of a signal by antennas 1 and 2 is coupled to an indicator 8 which may be for example either visual, such as a cathode ray oscilloscope, aural, such as a loud speaker or recording means.

Since indicator 8 is responsive only to those signals which are simultaneously received by antennas 1 and 2 due to the correlation function, it is obvious that only signals that arrive simultaneously at both antennas will be received. The loci of all points which are equidistant from antennas 1 and 2 is the perpendicular bisector 9 of the line joining antennas 1 and 2. Since transmitter 3 is located along this line, all emissions will be received simultaneously by both antennas; but since the interfering transmitters 4 are not situated on the perpendicular bisector 9, their radiations from any one interfering transmitter 4 will not simultaneously appear at both antennas 1 and 2 and will not be indicated since there will be no output from correlator 7 when the signals from any one transmitter do not arrive at the necessary antennas in time coincidence.

The radio signal separator system shown in Fig. 1 will produce indications from all transmitters located equidistant from antennas 1 and 2, thus enabling the system to substantially eliminate signals due to interfering radiations. However, if the base line 10 is continuously varied so that the perpendicular bisector is varied, the system shown in Fig. 1 may be utilized in a direction finder.

Figure 2:
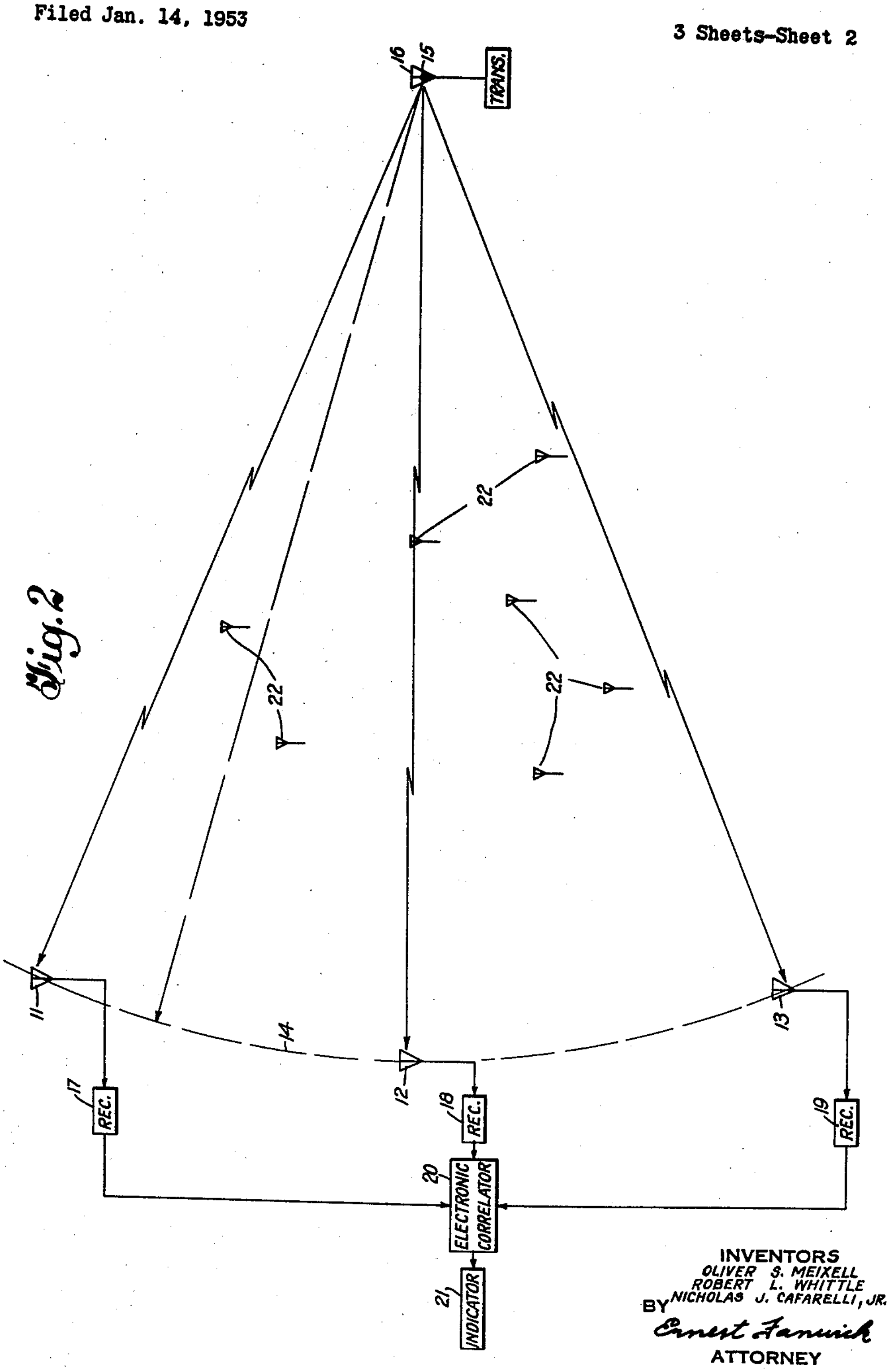
Fig. 2 is a schematic diagram in block form of a radio signal separator system responsive only to signals emitted by a transmitter location.

Referring to Fig. 2, the radio receiving system shown therein will be insensitive to all transmission except those emanating from a single predetermined location. A plurality of omnidirectional antennas 11, 12 and 13 are located along the arc 14 of a circle having its center geometrically located at point 15. Only those transmissions emanating from an antenna 16 located at point 15 are desired to be received. All signals received by the plurality of antennas 11, 12, and 13 are detected in their associated receivers 17, 18, and 19, respectively. The output of the receivers are coupled to an electronic correlator 20 which derives the product of the instantaneous values of the input signals from the receivers. The output of the correlator 20 is coupled to an indicator which produces an indication only when the instantaneous product from correlator 20 has a finite value. Due to the correlation process, correlator 20 will have an output only when antennas 11, 12, and 13 simultaneously receive a signal. In order to simultaneously receive a signal from a given antenna, the distance between each of the receiving antennas and the transmitting antenna must be equal. Thus only when a transmitter is located at the center 15 of the arc 14 joining the receiving antennas can this condition be met. Any interfering antenna 22 located at sites different from the center 15 will not produce simultaneous signal reception at all three receiving antennas. This is true even if an interfering antenna be located along the perpendicular bisector of a line joining any two receiving antennas. Thus by providing three receiving antennas 11, 12, and 13 located on the arc of a circle, only the emissions from a single transmitting antenna 15 will be received. From the foregoing discussion it is apparent that by utilizing two receiving antennas, as shown in Fig. 1, the locus of the position of the received radiators will be a line on a plane or more accurately a plane in space; by utilizing three receiving antennas, as shown in Fig. 2, the locus of the position of the received radiators will be a point on a plane or more accurately a line in space; and as a logical extension if four receiving antennas are situated on the surface of a sphere only the radiations emitted by a transmitter at the center of the sphere will be received.

Figure 3:
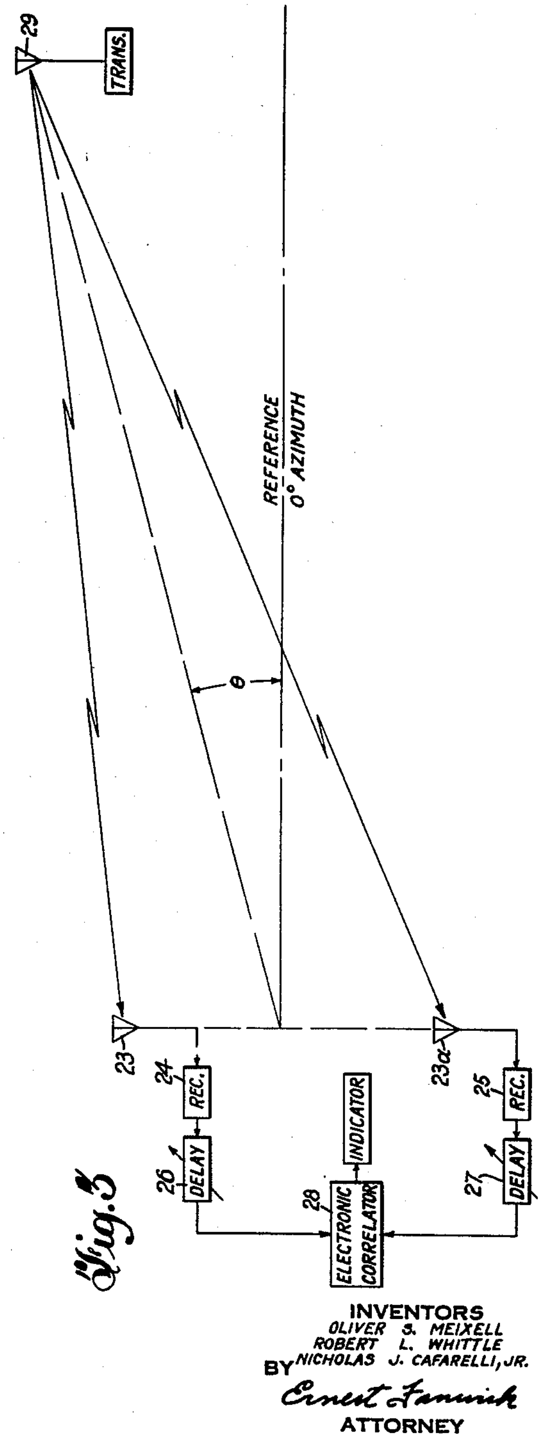
Fig. 3 is a schematic diagram in block form of a radio signal separator system responsive to pulse signals emitted by a transmitter at a predetermined location.

Referring to Fig. 3 a schematic diagram in block form of a radio signal separator system responsive only to pulse signals emitted by a transmitter at a predetermined line of position is shown, comprising a pair of omnidirectional receiving antennas 23 and **23*a*. Associated with each antenna 23 and 23*a* is a receiver 24 and 25 respectively. The output of each receiver 24 and 25 is coupled through an adjustable delay line 26 and 27 to an electronic correlator 28. The output of the correlator 28 comprises the product of its instantaneous inputs from delay lines 26 and 27. Assuming, for purposes of illustration, that it is desired to receive only those radiations emitted by an antenna located at point 29 it is obvious that when delay lines 26 and 27 are adjusted to insert equal delay times on the circuit, antenna 23 will receive the desired transmission before antenna 23*a* and thus the signal outputs of receivers 24 and 25 will not be time coincident resulting in a zero product output from correlator 28. However, if delay line 26 is adjusted to insert a delay equal to the time differential between the reception of the transmitted pulse signals from the one antenna 29 to the predetermined location. Since the adjustment of the time delay devices 26 and 27 is a mathematical function of the time difference in the transmission paths, the delay lines can be calibrated to yield the azimuth of a transmitter at an unknown location from the receiving antennas 23 and 23*a***.

In many instances it is desirable to continuously vary the time delay of circuits 26 and 27 so that the output of correlator 28 will vary between a maximum and minimum. By reading the azimuth to the source of radiations when the output of the correlator 28 is a maximum the system shown in Fig. 3 can readily be utilized as a direction finder.

Of course it is obvious that if the output of a third receiving antenna is added to the input of correlator 28 only those radiations of a transmitter at a predetermined point will be received.

Figure 4:
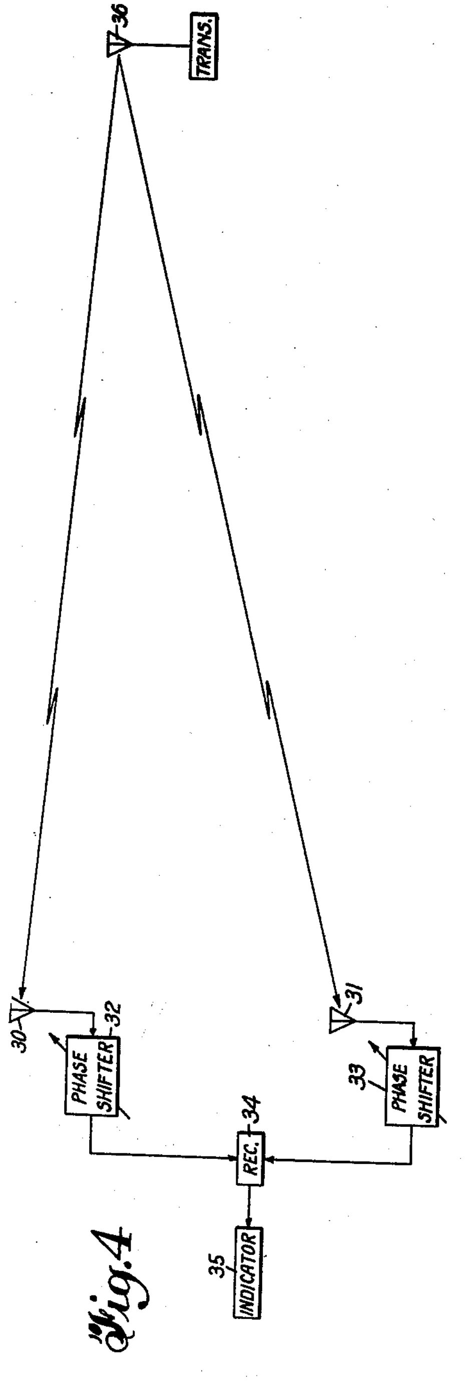
Fig. 4 is a schematic diagram in block form of a radio signal separator system responsive to the low frequency carrier wave emissions of a transmitter at a predetermined location.

Referring to Fig. 4 schematic diagram in block form of a radio signal system responsive to carrier wave signals emitted by a transmitter at a predetermined location is shown comprising a pair of omnidirectional antennas 30 and 31. Each antenna 30 and 31 is connected to the input terminal of an associated phase shifter 32 and 33. The output of each phase shifter 32 and 33 is coupled to an associated input terminal of a receiver 34.

The phase angle of each of the phase shifters 32 and 33 is continuously varied to obtain the maximum of the resulting correlation function that occurs at the output terminal of the receiver 34. The resulting maximum is interpreted in conjunction with the adjustment of the instantaneous phase angles of the phase shifters to provide the desired azimuth information.

It is obvious that when the C.W. signals from the transmitters are received by antennas 30 and 31 in phase, and the associated phase shifters 32 and 33 insert the same phase difference to the received signals before they are coupled to the receiver, the signals detected in the receiver 34 will be in phase and the resulting maximum correlation function will occur. However, if the signals received by antenna 30 should lead in phase the C.W. signals received by the other antenna 34, the maximum of the resulting correlation function will occur only when a suitable phase difference is inserted between the phase shifters 32 and 33 to insure that the signal input to receiver 34 is in plane. Each of the phase shifters 32 and 33 may be calibrated so that the azimuth from the receiving antennas 30 and 31 to the transmitting antennas may be read directly.

Figure 5:
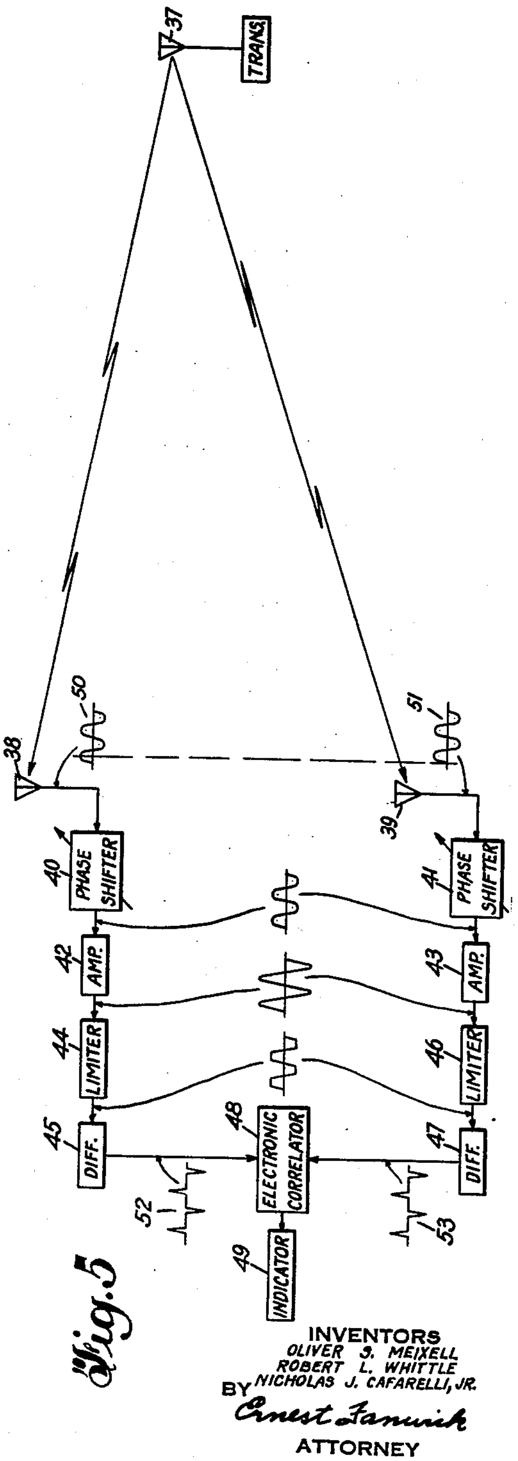
Fig. 5 is a schematic diagram in block form of an improved alternate embodiment of the radio signal separator system shown in Fig. 4.

Referring to Fig. 5 an alternate embodiment of a radio signal separator system responsive to carrier wave signals emitted by a transmitter at a predetermined location is shown comprising a pair of omnidirectional antennas 38 and 39 whose outputs are coupled to continuously variable phase shifters 40 and 41. The output of the phase shifters 40 and 41 are coupled to amplifiers 42 and 43 whose output are individually limited and differentiated in circuits 44 and 45, 46 and 47 respectively. The output of circuits 45 and 47 are two trains of pulses which are conveyed to an electronic correlator 48 whose output will be maximum as shown by indicator 49 when the R.F. phase shifters 40 and 41 are adjusted to compensate for the difference in phase between the signals received to each of the receiving antenas 38 and 39.

Thus, as shown by curves 50 and 51, if the signals received by antenna 39 lag in phase the signals received by antenna 38, the phase shifters 40 and 41 may be adjusted to cause the received signals to be coupled in phase to the limiters 44 and 46 before they are differentiated on circuits 45 and 47. The output of each of the differentiators 45 and 47 were in phase due to the adjustment of the phase shifters 40 and 41 the pulses in each of the two trains 52 and 53 will be time coincident providing a maximum output from correlator 48.

While we have described above the principles of our invention in connection with specific apparatus, it is to be clearly understood that this description is made only by way of example and not as a limitation to the scope of our invention as set forth in the objects thereof and in the accompanying claims.

We claim:

1. A radio receiver system to detect pulsed carrier signal radiations emitted by a transmitter comprising a plurality of omnidirectional antennas, means associated with each of said antennas to detect signals received by said antenna to provide pulses at the outputs thereof, means to obtain the instantaneous product of the pulse outputs of said detectors and time delay means to couple the output of said detectors to said product means in time coincidence to obtain the maximum correlation of said received signals.

2. A system according to claim 1 which further includes means to calibrate said time delay means to provide an indication of the azimuth of said transmitter from said receiving antennas.

3. A radio receiver system to detect pulsed carrier signals emitted by a predetermined transmitter comprising a plurality of omnidirectional antennas greater than two situated on an arc of a circle having the location of said predetermined transmitter as its center, a receiver associated with each of said antennas to detect signals received by said antenna and provide pulses at the outputs thereof, and correlating means coupled to the outputs of said receivers to produce an indication only when said antennas simultaneously receive signals.

References Cited in the file of this patent

UNITED STATES PATENTS

| | | |
|---|---|---|
| 961,265 | Stone | June 14, 1910 |
| 984,108 | Roos | Feb. 14, 1911 |
| 1,491,372 | Alexanderson | Apr. 22, 1924 |
| 1,510,792 | Merritt | Oct. 7, 1924 |
| 1,723,907 | Alexanderson | Aug. 6, 1929 |
| 2,041,600 | Friis | May 19, 1936 |
| 2,166,991 | Guanella | July 25, 1939 |
| 2,173,858 | Pierce et al. | Sept. 26, 1939 |
| 2,245,660 | Feldman et al. | June 17, 1941 |
| 2,262,931 | Guanella | Nov. 18, 1941 |
| 2,448,006 | Starr | Aug. 24, 1948 |
| 2,468,109 | Richardson et al. | Apr. 26, 1949 |
| 2,509,208 | Busignies et al. | May 30, 1950 |
| 2,584,165 | Starr | Feb. 5, 1952 |